United States Patent
Kumar et al.

(10) Patent No.: US 9,467,382 B2
(45) Date of Patent: Oct. 11, 2016

(54) ELASTIC SERVICE CHAINS

(71) Applicant: Cisco Technology, Inc., San Jose, CA (US)

(72) Inventors: Surendra Kumar, San Ramon, CA (US); David Chang, Milpitas, CA (US); Nagaraj Bagepalli, Fremont, CA (US); Abhijit Patra, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 230 days.

(21) Appl. No.: 14/170,750

(22) Filed: Feb. 3, 2014

(65) Prior Publication Data
US 2015/0222640 A1    Aug. 6, 2015

(51) Int. Cl.
| | |
|---|---|
| H04L 1/00 | (2006.01) |
| H04L 12/803 | (2013.01) |
| H04L 12/911 | (2013.01) |
| H04L 12/721 | (2013.01) |
| H04L 12/24 | (2006.01) |
| H04L 29/06 | (2006.01) |

(52) U.S. Cl.
CPC .......... *H04L 47/125* (2013.01); *H04L 47/782* (2013.01); *H04L 41/50* (2013.01); *H04L 45/38* (2013.01); *H04L 63/20* (2013.01)

(58) Field of Classification Search
CPC ....... H04L 41/50; H04L 45/38; H04L 47/10; H04L 41/5041; H04L 47/175; H04L 47/782; H04L 63/20
USPC ............. 1/50; 45/38; 47/10, 175, 782; 63/20
See application file for complete search history.

(56) References Cited

U.S. PATENT DOCUMENTS

| | | | |
|---|---|---|---|
| 7,558,261 B2 | 7/2009 | Arregoces et al. | |
| 7,571,470 B2 | 8/2009 | Arregoces et al. | |
| 7,610,375 B2 | 10/2009 | Portolani et al. | |
| 7,643,468 B1 | 1/2010 | Arregoces et al. | |
| 7,657,940 B2 | 2/2010 | Portolani et al. | |
| 8,311,045 B2 | 11/2012 | Quinn et al. | |
| 8,442,043 B2 | 5/2013 | Sharma et al. | |
| 2004/0107273 A1* | 6/2004 | Biran ................... | H04L 67/1002 709/223 |
| 2006/0067249 A1* | 3/2006 | Poustchi ............ | H04L 67/1068 370/260 |
| 2006/0092950 A1 | 5/2006 | Arregoces et al. | |
| 2006/0095960 A1 | 5/2006 | Arregoces et al. | |
| 2008/0177896 A1 | 7/2008 | Quinn et al. | |
| 2010/0165985 A1 | 7/2010 | Sharma et al. | |
| 2013/0163606 A1 | 6/2013 | Bagepalli et al. | |
| 2014/0341029 A1* | 11/2014 | Allan .................... | H04L 47/125 370/235 |
| 2014/0344439 A1* | 11/2014 | Kempf ................. | G06F 9/5072 709/224 |

OTHER PUBLICATIONS

Rosen, et al., "BGP/MPLS IP Virtual Private Networks (VPNs)," Network Working Group, RFC 4364, Feb. 2006, pp. 1-47.
Parker, R., "Service Function Chaining: Chain to Path Reduction, draft-parker-sfc-chain-to-path-00", SFC, IETF, Internet Draft, Nov. 8, 2013, 11 Pages.
Boucadair et al., "Differentiated Service Function Chaining Framework, draft-boucadair-service-chaining-framework-00", Network Working Group, Internet-Draft, Aug. 30, 2013, 24 Pages.

* cited by examiner

*Primary Examiner* — Jutai Kao
(74) *Attorney, Agent, or Firm* — Edell, Shapiro & Finnan, LLC

(57) ABSTRACT

Presented herein are elastic service chain techniques. In one example, a network element receives data traffic to be processed by a service chain that specifies an ordered sequence of service pools including a first service pool and second service pool, wherein each service pool comprises a plurality of network services. A network service is determined from the first service pool to be applied to the data traffic, and data traffic is forwarded to the network service in the first service pool.

21 Claims, 7 Drawing Sheets

SERVICE FORWARDING TABLE

| CHAIN ID \ INDEX | 0 | 1 | 2 |
|---|---|---|---|
| SC1 | SPa | SPb | SPc |
| SC2 | | | |
| SC3 | | | |

FIG.4A

SERVICE POOL TABLE

| POOL ID \ INDEX | 1 | 2 | 3 |
|---|---|---|---|
| SPa | SA1 | SA2 | SA3 |
| SPb | SB4 | SB5 | SB6 |
| SPc | SC8 | SC9 | |

FIG.4B

ELASTIC SERVICE CHAINS

TECHNICAL FIELD

The present disclosure relates to networking for service chains.

BACKGROUND

Network services are widely deployed and useful in many networks. The services provide a range of functions such as security, wide area network (WAN) acceleration, firewall, Network Address Translation (NAT), deep packet inspection (DPI), intrusion detection service (IDS), server load balancing, etc. Services may be physically located at different points in the network infrastructure, such as the WAN, data center, campus, and so forth.

In certain circumstances, services may be applied as part of a "service chain." A service chain is a data structure defining a set of service nodes hosting various services and the order in which the services should be applied to the data/payload (e.g., video data, numeric data, alphanumeric data, voice data, etc.) of selective traffic (packets/frames).

BRIEF DESCRIPTION OF THE DRAWINGS

FIGS. 4A and 4B are tables utilized by an example implementation of elastic service chaining techniques.

DESCRIPTION OF EXAMPLE EMBODIMENTS

Overview

Figure 1:
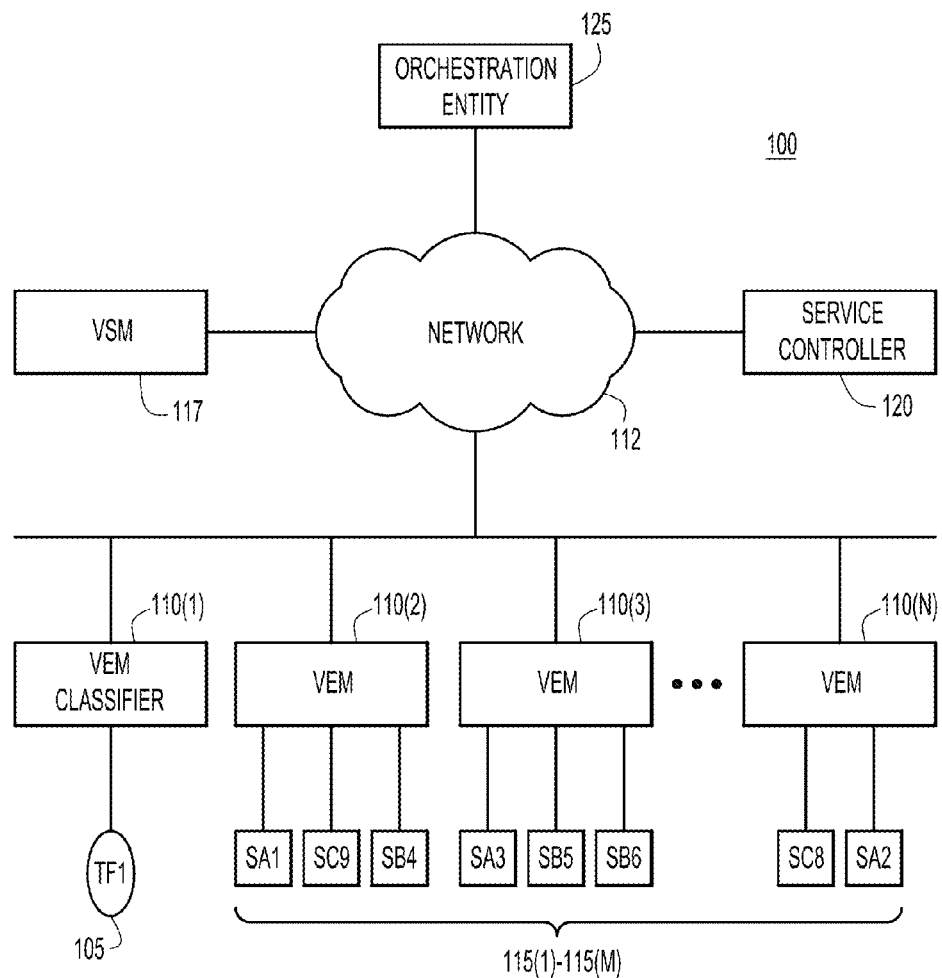
FIG. 1 is a block diagram of an example computing environment configured to implement elastic service chaining techniques in accordance with examples presented herein.

Presented herein are elastic service chain techniques. In one example, a network element receives data traffic to be processed by a service chain that specifies an ordered sequence of service pools including a first service pool and second service pool, wherein each service pool comprises a plurality of network services. A network service is determined from the first service pool to be applied to the data traffic, and data traffic is forwarded to the network service in the first service pool.

Example Embodiments

Service chaining involves the interception and steering of network traffic through a series of service nodes (i.e., physical or virtual network elements) that each host one or more services. The traffic is intercepted through the use of a classifier function at a network node (i.e., switch, router, etc.) that serves as a head-end node to the service chain. The network element that executes the classifier function is sometimes referred to herein as a "classifier" or "classifier node."

Service chaining according to techniques presented herein may be implemented in a network utilizing physical and/or virtual routers, physical switches and/or a distributed virtual switch (DVS). An example presented herein will discuss the use of a DVS. A DVS is a virtual switch that extends its ports and management across multiple servers in a cluster so that the network can be managed from a centralized perspective. Each DVS may have a plurality of Virtual Ethernet Modules (VEMs) distributed across physical servers in the network which define the same name, network policy and port group. Each VEM may have the ability not only to forward network traffic, but may be configured to allow each VEM to forward traffic to services as well. Traffic flows coming into the network may be classified, and then forwarded using one or more Layer 2 (L2)/Layer 3 (L3) service overlays in the network. In other words, a VEM may intercept traffic, whether external to the virtual machine or traffic from virtual machine to virtual machine, and then redirect the traffic to the appropriate service node, which may be L2 or L3 adjacent.

Network traffic may be encapsulated with one or more headers, such as network service headers ("service header") and transport headers, to facilitate tracking of the forwarding state. A service header is part of the data plane of a service chain and includes metadata specifically formatted for consumption by a service. The metadata may include, for example, an application identifier (ID), flow or path ID, client or user ID, network classification information used for deriving targeted service policies and profiles, common metadata related to a particular service such as finer classification that can be passed to the services further down the service path, etc. In other words, services benefit from metadata derived both from the network as well as the services that form a given service chain.

Each VEM in the DVS may maintain a service forwarding table, which may be used in conjunction with the service header to determine how to forward a data flow down the service chain. A service chain such as chain "SC1" may be identified by a service path identifier in the data plane. A service controller may map a service chain identifier to a service path identifier, and may also maintain the service forwarding table, which contains service path identifier to next service mappings. The service controller may also maintain the service forwarding table at multiple locations around the network, including at each VEM and the classifier node.

Each entry in a service forwarding table forms a triple of a service path identifier ("Chain ID"), service path location (e.g., "Index"), and next-hop service ("SA1"). A service forwarding table may have the following structure:

TABLE 1

Service Forwarding Table

| Chain ID | Index | | |
|---|---|---|---|
| | 0 | 1 | 2 |
| SC1 | SA1 | SB2 | SC3 |
| SC2 | | | |
| SC3 | | | |

Forwarding traffic flows through service chains involves traffic steering by the infrastructure (in this case, VEMs) through all the services. When a traffic flow arrives in the network, the classifier node determines a classification and selects an appropriate service chain given the classification. For example, a traffic flow may be classified as needing video optimization, and the classifier node will select a service chain that is capable of performing the optimization. The classifier node may encapsulate one or more packets in the traffic flow with a service header containing a service chain identifier ("chain ID" from table 1) or service path identifier, as well as a service index number ("index" from table 1) initialized to the first service in the chain. Using the chain ID and index from the service header, each VEM may use its service forwarding table to determine the next-hop service. Each packet in a given traffic flow may be encapsulated by the classifier node in this manner.

In an example, a VEM in a network may receive a packet containing a service header. The VEM may read the service chain identifier as "SC1," and the service sequence number, or index, as "1." "SB2" would be the associated next-hop service in the chain according to the VEM's service forwarding table, which is a service of type B. This type may be one of the services listed above, for example a deep packet inspection (DPI) service. There may be multiple equivalent services of substantially the same type and/or performance in the network labeled SB1, SB2, etc. Similarly, firewall services may be labeled SA2, SA3, etc. However, based on the service forwarding table entry contents (next service) for the service chain SC1 and index 1, the VEM may forward the traffic flow to service SB2. Upon receiving the serviced traffic, the VEM may then increment the location value in the service index, and forward the traffic flow to potentially a second VEM that is adjacent (or directly connects) to service SB2.

A problem arises because services in a service chain may have differing capacity specifications which may create bottlenecks. "Capacity" may include traffic throughput, total number of connections/flows, connection/flow rate, among others. Additionally, some services may be used by multiple service chains, and thus certain services in a chain may be at capacity, even though the specifications of each service in the chain may be similar. Some services may consume a large quantity of a certain resource type compared to others in the chain due to the nature of the service provided. As a result, matching one specification such as throughput when creating a service chain may not lead to overall matching of services, i.e. for the same throughput specification, the number of connections supported among the services in the chain may differ substantially. All this leads to service chains that may not only be mismatched in their capacities, but that also cannot scale to meet the demand, at least not without manual intervention. Further, as demand fluctuates, there may be wasted capacity if the services are over-provisioned due to periodic or momentary spikes in demand.

One solution to these problems would be to deploy multiple identical service chains and load balance traffic among the chains. However, such a solution may still waste capacity, as when demand is low, service chain capacity goes unused. Further, when demand exceeds the deployed capacity, manual intervention is needed to provision more service chains which in turn may require reconfiguration and downtime. Even if service capacities do match, if one service fails, the entire chain has to be brought down. In other words, a chain is only as strong as its weakest link.

To summarize, service chain capacities may be mismatched, as specifications and utilization along the chain may vary. Further, some in-line services may not perform to specification. The service chains also have static capacities which cannot be scaled due to varying load or demand. The lack of scaling may lead to over-provisioning, where an administrator may go to the effort of adding an additional service chain to accommodate what turns out to be a momentary burst in demand. The solutions above further require manual interventions to scale up and down the service chains, involving either upgrading the services, or creating additional service chains. During the upgrade, existing service chains may need to be taken offline leading to non-availability of the service chain. This all may be complex, time consuming, difficult to manage and even impractical. Further, whole service chains may go down due to a failure of a single service node.

Reference is now made to FIG. 1 for a description of an example network 100 in which techniques presented herein may be employed. One or more traffic flows (labeled "TF 1") 105 may arrive at a classifier 110(1), and are forwarded across network 112 to services 115(1)-115(M) associated with one or more VEMs 110(1)-110(N). In the example shown in FIG. 1, associated with VEM 110(2) are services SA1, SC9, and SB4, associated with VEM 110(3) are services SA3, SB5 and SB6, and associated with VEM 110(N) are services SC8 and SA2. The significance of the naming convention given to services 115(1)-115(M) is relevant to the service pooling techniques described in more detail hereinafter. The virtual supervisor module (VSM) 117 may control and configure each VEM 110(1)-110(N).

Rather than individual services, each link in a service chain may comprise either an individual service or a pool of services, any of which may be used for a given traffic flow associated with the chain. A service controller 120 may maintain tables in the relevant network elements, such as VEMs 110(1)-110(N), to facilitate these techniques. Further, the service controller may coordinate with an orchestration entity 125 to add or remove services from the service pools automatically without manual intervention, as will be discussed further below. The orchestration entity 125 may be a software suite such as VMware vCenter, OpenStack, etc.

Figure 2:
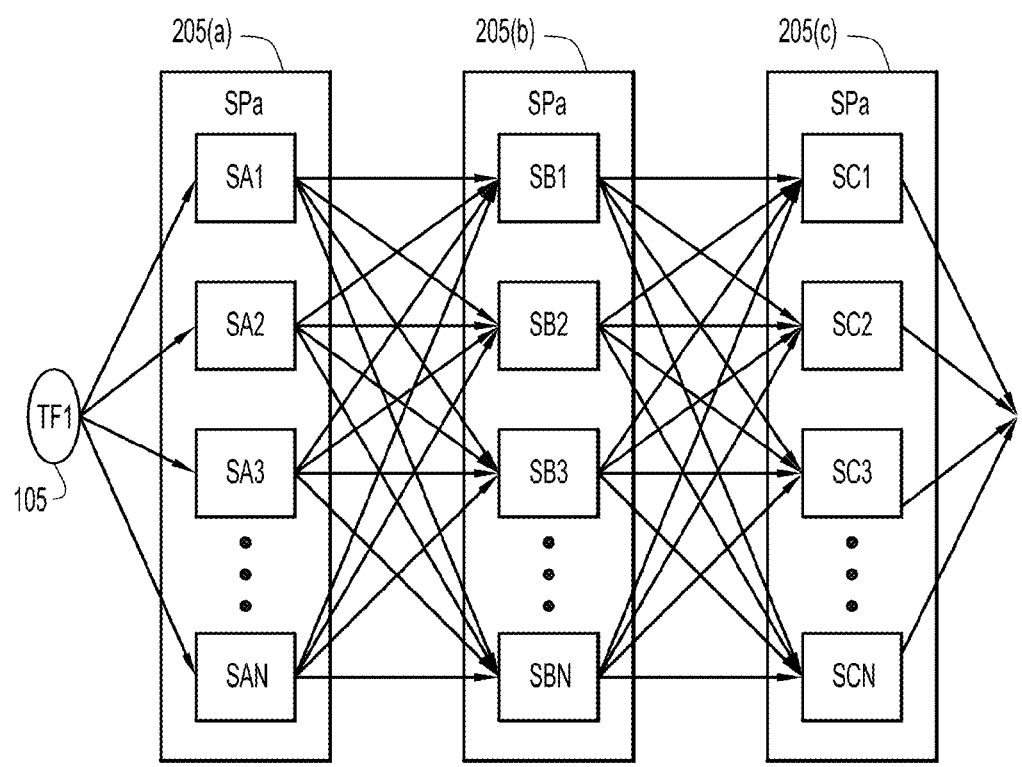
FIG. 2 is a block diagram illustrating service pools implementing elastic service chains according to techniques presented herein.

FIG. 2 is now described with continued reference to FIG. 1. FIG. 2 shows a logical representation of individual services in a service chain substituted/replaced with service pools 205(a)-205(c), according to techniques presented herein. For example, a service chain SA1→SB2→SC3 may be replaced by a service chain of service pools SPa→SPb→SPc. Each service pool may contain multiple equivalent services of substantially the same type and/or performance. As conceptually shown in FIG. 2, any service in a given service pool may be chosen to service the traffic, dynamically—at the time of forwarding the traffic to the service. For example, service pool 205(a), labeled service pool "SPa," includes a plurality of service instances SA1, SA2, . . . , SAN of substantially the same type. Likewise, service pool 205(b), labeled service pool "SPb," includes a plurality of service instances SB1, SB2, . . . , SBN of substantially the same type. Similarly, service pool 205(c), labeled service pool "SPc," includes a plurality of service instances SC1, SC2, . . . , SCN of substantially the same type. It is also possible that each service in a plurality of service pools includes a plurality of similar function network services.

The service controller 120 may monitor each service pool 205(a)-205(c) to maximize resource usage. As will be discussed below, the service controller may interact with the orchestration entity 125 to instantiate new services (or delete existing services) for a given service pool until a given capacity measurement is equal to one or more other pools in the service chain. Each pool may be dynamically adjusted in this manner, thus avoiding the requirement for manual intervention when there are variations in load, and leading to optimal resource usage. This is to say that the pools are elastic. Each service pool in a service chain may scale up and down not only to match the service capacities in the chain, but more importantly to the demand. The service chains are also made resilient, as individual service node failures do not bring down the entire service chain. While service pools 205(a)-205(c) are shown in FIG. 2, individual services may also be used along with service pools in the service chains. This is also to say that service pools may contain exactly one service in the set. While FIG. 2 shows a group of services located together in a given pool, the services may be located anywhere in the network 100, and may migrate from one network element to another, yet remain members of a given logical service pool. This is shown in FIG. 1, where some services of the same pool are associated with different VEMs. That is, associated with VEM 110(2) are services SA1, SC9 and SB4, and according to this naming structure, this is intended to indicate that these are services from three different service pools, i.e., SA1 is part of service pool SPa, service SC9 is part of service pool SPc, and service SB4 is part of service pool SPb. A similar situation is found at VEM 110(3) and VEM 110(N) in the example of FIG. 1.

Figure 3:
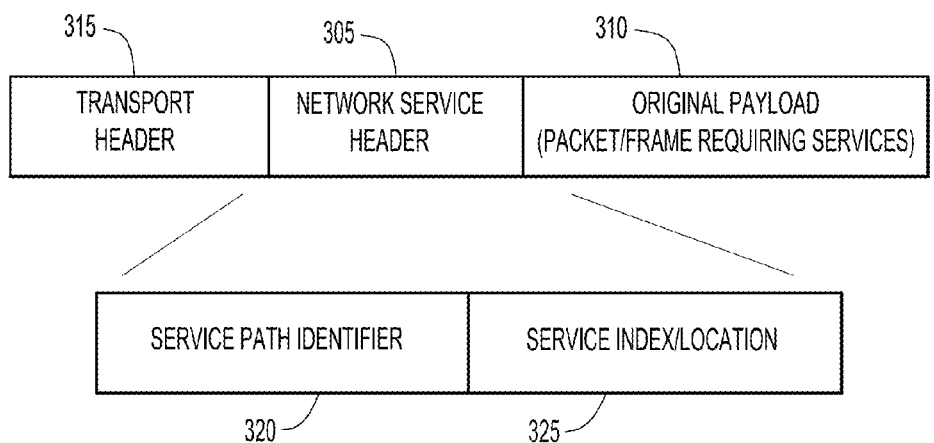
FIG. 3 is a block diagram illustrating packet structures utilized by an example implementation of elastic service chaining techniques.

Reference is now made to FIG. 3. FIG. 3 is a block diagram illustrating an example network service header 305. As discussed above, the original packet requiring servicing may be encapsulated at the classifier 110(1) in a transport header 315, which acts as an overlay. The network service header 305 may also be inserted, which acts as shim that contains information about the forwarding state. The network service header 305 may contain a service path identifier 320, or chain ID, and a service index 325. The service index 325 is the current service location, and may also be used for loop detection.

Reference is now made to FIGS. 4A and 4B, with continued reference to FIG. 1. FIGS. 4A and 4B illustrate the service forwarding table and service pool table, respectively. In techniques presented herein, the service forwarding table may be modified to contain a service pool identifier rather than a service identifier. As an example, a service chain SC1 may now be defined as SC1={SPa, SPb, SPc}, where service pool SPa={SA1, SA2, SA3}, pool SPb={SB4, SB5, SB6}, and pool SPc={SC8, SC9}.

In FIG. 4A a service forwarding table is shown with the service index 325 (location) as column headers, and the service path identifier 320 (chain ID) as row headers. Using the service path identifier 320 and the service index 325 described in connection with FIG. 3, the "next hop" service pool may be determined. However, as explained above, a service pool is a logical collection of services that may be located on many physical network element in a network. Thus, knowing the next hop service pool is not determinative of the next hop service node instance and the associated network element such as a VEM.

In FIG. 4B a service pool table is shown with a second service index as column headers, and the service pool identifiers as row headers. Using the next hop service pool identifier, and a second service index from the service index field, the particular next-hop service node may be determined. Both the service forwarding table and the service pool table may be maintained by the service controller 120, which may forward the tables to each network element performing service chaining, such as VEMs 110(1)-110(N).

The index in the service header along with the service chain (path) identifier help determine the service pool to be used. The service pool to actual service node instance mapping is performed by the VEM with help from the service controller. The same index may also identify a service node instance. In other words, the index is an index/location in to the service chain. Thus, the same index is used to index into a service pool-table or a node-table, for that service chain.

The selection of an individual service from a service pool to be used for a given traffic flow may be made by the classifier 110(1) or any of the network elements (VEM for instance) that participate in the service forwarding. The classifier 110(1), as discussed above, may be a router, switch, virtual network element, VEM, etc., and may perform a load balancing algorithm to select a service from each service pool at the time of steering a packet into the service chain. While load balancing may add marginal processing time when compared with non-pooling techniques, the service pools allow for elastic and dynamic expansion or contraction of capacity. Network elements performing the load balancing decision to select the individual service from a pool may use predictors. The predictors may function simply based on the number of services in the pool, such as a round-robin, to complex ones which may require interaction with the service controller 120 (active or passive) to obtain the data/metrics needed to perform the service selection. The network elements performing the load balancing may also consider which services are at or close to capacity, and the bandwidth capacity (throughput) of each service.

Once an individual service is selected from each pool for a given traffic flow which further may be associated with a given subscriber, future packets in the flow may be forwarded to the same set of individual services, thus providing "stickiness." Stickiness is achieved when given traffic flows are consistently forwarded along the same path in a network. Since some services are stateful, i.e. maintain state information about packets in traffic flows, stickiness needs to be preserved or the state may be lost. Some loss of state may still occur, such as in the event of a service failure. The loss of state may cause the traffic connection to malfunction or fail entirely. Stickiness also protects against jitter, which is to say it prevents packets from arriving out of order. Stickiness may be preserved for a given session, connection, flow or a given subscriber. The VEM, when determining the next hop service node, performs load balancing. This load balancing mechanism may use information from the service controller, which in turn collects it from the services through various methods. Thus, in techniques presented herein, load balancing across the service pools may be implemented while maintaining stickiness.

In the event of a service failure or related outage, any traffic flows using the failed service may be automatically migrated to other services in the pool in a load-balanced manner. Further, any states on the failed service may be recovered and transferred to the newly assigned services for each flow, although in some cases state recovery is not possible. Any new flows classified to such a service chain constructed using service pools thus can be serviced by one of the available service nodes in the pool and a single service node failure does not impact the service. The service chains are thus resilient in that a failure of one or more services in a service pool does not lead to the failure of entire service chains as in prior techniques. The predictors in the infrastructure may be notified of the service failure (via the service controller 120), which in turn removes the failed service from the service load balancing and selection process.

The service controller 120 may play a critical role throughout this process. The service controller 120 may monitor various metrics of each service in each service pool such as health, throughput, connections per second, connections, memory utilization rate, central processing unit (CPU) load, pool aggregation metrics, etc. These metrics help make load balancing decisions, as the service controller 120 may instruct other network elements involved in the load-balanced selection of services to avoid congested services in the pools. The metrics also help the service controller 120 determine if a given pool has an appropriate capacity, such that the service controller 120 may coordinate with the orchestrator 125 to add or reduce the number of services in each pool as demand dictates. The metrics for each service may be reported in a variety of ways. There may be lightweight software agents on each service reporting to the service controller 120. The service controller 120 may also request metrics from one or more services using, for example, Simple Network Management Protocol (SNMP) queries. Extended Network Management Protocol (XNMP) queries may also be used. The network elements such as VEMs 110(1)-110(N) may also report directly to the service controller 120 on the state of their associated services. All of these methods may be performed automatically in a predetermined manner and at a predetermined frequency.

As mentioned above, the service controller 120 may also coordinate with the orchestration entity 125 to provision new services, create or remove new pools, and add services to or remove services from existing pools. These actions may be based on the health and capacity metrics monitored at the pool and individual service level. The metrics may be used in any number of ways and combinations by the service controller 120 to determine the health as well as capacity of each service and service pool. For example, measuring throughput at the ingress and egress interfaces of every service may be queried (or alternatively reported) by the service controller 120. The service controller 120 may then compare the aggregate input throughput of a service pool with the aggregate output throughput of the prior service pool to determine if there is a capacity match. The service controller 120 may also set one or more predetermined mismatch thresholds, which when exceeded trigger automatic interaction with the orchestration entity to scale the relevant service pool up by instantiating more services into the pool, or bringing down some services in the pool. Unlike prior techniques, the service chains may be kept on line while these dynamic changes are occurring. Thus, in response to detecting that performance metrics for a network service in the service pool have changed with respect to a predetermined threshold, the network service is either removed from the service pool a network service is added to the service pool.

Figure 5:
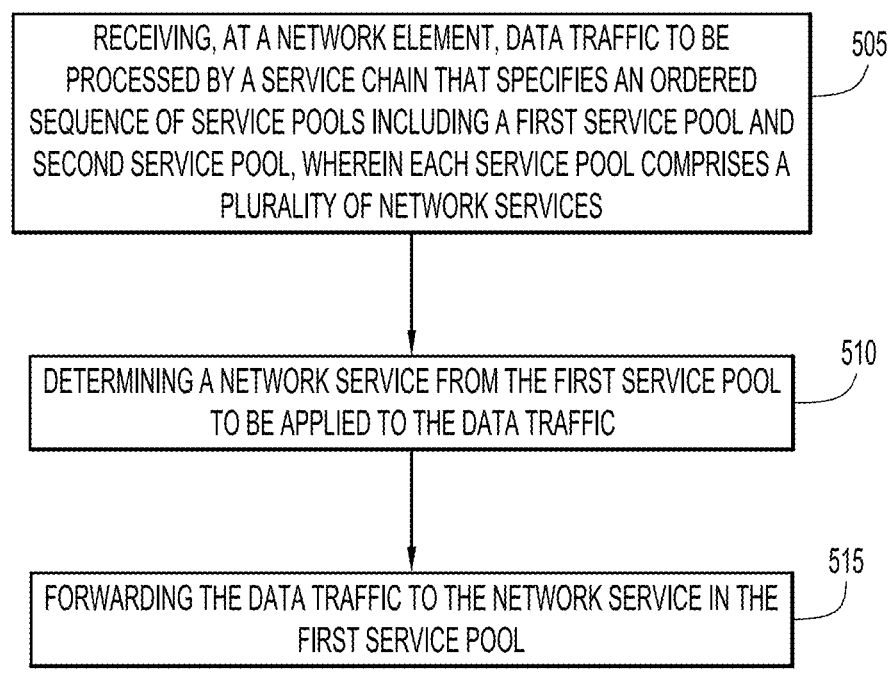
FIG. 5 is a flowchart of an elastic service chain process according to techniques presented herein.

FIG. 5 is a high level flowchart of an elastic service chain process according to techniques presented herein. At step 505, data traffic to be processed by a service chain that specifies an ordered sequence of service pools including a first service pool and second service pool, is received at a network element, wherein each service pool comprises a plurality of network services. At step 510, a network service from the first service pool to be applied to the data traffic is determined. At step 515, after the network is applied to the data traffic, the data traffic is forwarded to the network service in the first service pool.

Figure 6:
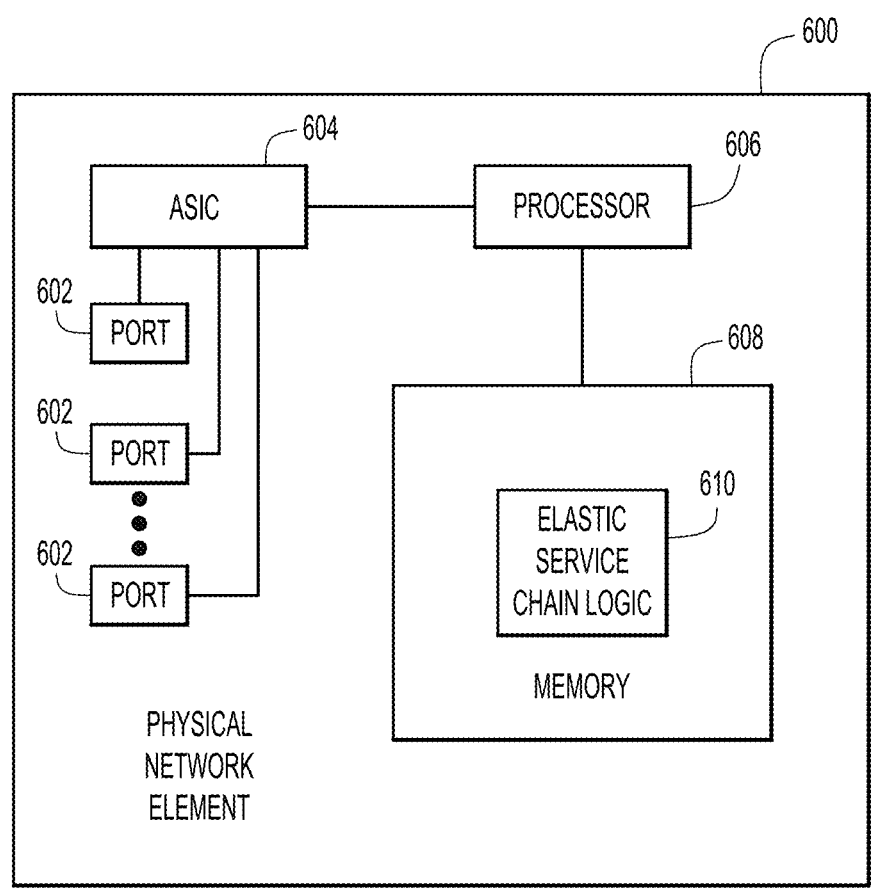
FIG. 6 is a block diagram of a network element configured to perform elastic service chain techniques in accordance with examples presented herein.

FIG. 6 illustrates an example block diagram of a network element 600 used to implement techniques presented herein, such as a switch, router, gateway, or any network device or node configured to perform certain operations described herein. It should be understood that a virtual network node such as a VEM 110(1)-110(N) would be a software-emulated or virtualized version of what is shown in FIG. 6. The network element 600 comprises a plurality of ports 602, a network Application Specific Integrated Circuit (ASIC) 604, a processor or central processing unit (CPU) 606, and memory 608. The ports 602 receive packets to, and output packets from, the network element. In certain examples, one or more of the ports 602 are connected to VLANs for forwarding packet data to services.

The ASIC 604 directs incoming packets to ports for egress according to logic as well as controls from the processor 606. For example, if the network node is a router, then the ASIC 604 is a router ASIC configured for network routing functions, and if the network node is a switch, then the ASIC 604 is a switch ASIC configured for network switch functions. The processor 606 is a microprocessor or microcontroller, for example, and executes instructions for the elastic service chain logic firmware/software 610 stored in memory 608. The elastic service chain logic firmware/software 610, includes instructions that, when executed by the processor 606, cause the processor to perform the operations described herein for a physical network element (node).

The memory 608 may comprise read only memory (ROM), random access memory (RAM), magnetic disk storage media devices, optical storage media devices, flash memory devices, electrical, optical, or other physical/tangible memory storage devices. In general, the memory 608 may comprise one or more tangible (non-transitory) computer readable storage media (e.g., a memory device) encoded with software comprising computer executable instructions and when the software is executed (by the processor 606) it is operable to perform the operations described herein.

Figure 7:
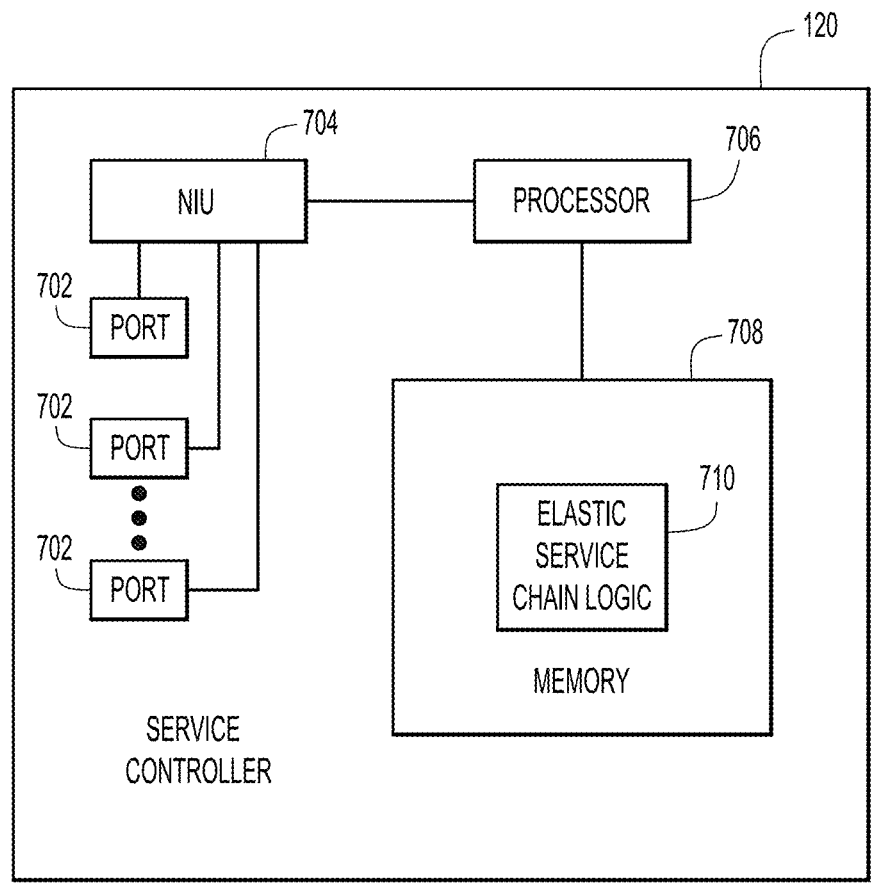
FIG. 7 is a block diagram of a service controller in accordance with examples presented herein.

FIG. 7 is an example block diagram of service controller 120. It should be understood that a virtual controller would be a software-emulated or virtualized version of what is shown in FIG. 7, such as software running on commodity hardware in a data center. The service controller 120 includes one or more processors 706, memory 708, one or more ports 702 and a network interface unit 704. The processor 706 may be a microprocessor or microcontroller. The network interface unit 704 facilitates network communications between the service controller 120 and network nodes (e.g., classifiers, service nodes, etc.). The processor 706 executes instructions associated with software stored in memory 708. Specifically, the memory 708 stores elastic service chaining logic software 710 that, when executed by the processor 706, causes the processor 706 to perform the elastic service chaining operations described herein for the service controller 120.

The memory 708 may comprise read only memory (ROM), random access memory (RAM), magnetic disk storage media devices, optical storage media devices, flash memory devices, electrical, optical, or other physical/tangible memory storage devices. In general, the memory 708 may comprise one or more tangible (non-transitory) computer readable storage media (e.g., a memory device) encoded with software comprising computer executable instructions and when the software is executed (by the processor 706) it is operable to perform the operations described herein.

In summary, a method is provided herein comprising: receiving, at a network element, data traffic to be processed by a service chain that specifies an ordered sequence of service pools including a first service pool and second service pool, wherein each service pool comprises a plurality of network services; determining a network service from the first service pool to be applied to the data traffic; and forwarding the data traffic to the network service in the first service pool. After a network service in the first service pool is applied to the data traffic, the data traffic is forwarded to a network service in the second service pool. Determining a network service from the first service pool may comprise selecting the network service according to a load balancing algorithm applied to the first service pool.

Furthermore, as described above, a determination may be made that the first service pool associated with the service chain has a capacity lower than the second service pool, wherein capacity of a given service pool is based on an accumulation of the capacities of the plurality of network services in a given service pool. Dynamically instantiated network services are associated with the first service pool until the capacity of the first service pool is substantially equal to the second service pool. The capacity is computed from one or more of total data traffic throughput, total number of connections, and connection rate.

Similarly, a determination may be made that the first service pool associated with the service chain has a capacity below a predetermined capacity requirement. Dynamically instantiated network services are associated with the first service pool until the capacity of the first service pool meets or exceeds the predetermined capacity requirement.

Further still, a determination may be made that the first service pool associated with the service chain has a capacity above a predetermined capacity requirement. Network services from the first service pool are removed until the capacity of the first service pool is substantially equal to the predetermined capacity requirement.

Still further, in response to detecting that performance metrics for a network service in the first service pool have changed with respect to a predetermined threshold, the network service is removed the first service pool or a network service is added to the first service pool.

An apparatus is provided comprising a plurality of network ports; a network processor unit coupled to the plurality of network ports; a processor coupled to the network processor unit, and configured to: receive, at a network element, data traffic to be processed by a service chain that specifies an ordered sequence of service pools including a first service pool and second service pool, wherein each service pool comprises a plurality of network services; determine a network service from the first service pool to be applied to the data traffic; and forward the data traffic to the network service in the first service pool.

A computer-readable storage media encoded with software comprising computer executable instructions and when the software is executed operable to: receive, at a network element, data traffic to be processed by a service chain that specifies an ordered sequence of service pools including a first service pool and second service pool, wherein each service pool comprises a plurality of network services; determine a network service from the first service pool to be applied to the data traffic; and forward the data traffic to the network service in the first service pool.

The embodiments described herein involve spawning new services as needed in collaboration with an orchestration entity based on a feedback loop and programming service path-enabled data planes to dynamically re-balance flows to adapt to changing service pools, all while maintaining stickiness of traffic. Static, manually-maintained chains of single services may be replaced with dynamic, automatically-maintained, elastic chains of service pools. These techniques allow service chains to be tolerant of individual service failures within a pool. The selection of individual services is abstracted, thereby easing the deployment complexity. The capacity may be matched to current demand by automatically adding or decreasing the numbers of service nodes in the service pools. The actual capacities of individual service nodes may be monitored, which may differ from a vendor's claimed capacity, and thus allow the capacities of adjacent service pools in a chain to be balanced. Service chain resiliency may also be increased, since service failure or updating does not bring down an entire chain. Capital expenditures may also be reduced due to the efficient utilization of services and resources.

The above description is intended by way of example only. Various modifications and structural changes may be made therein without departing from the scope of the concepts described herein and within the scope and range of equivalents of the claims.

What is claimed is:

1. A method comprising:
receiving, at a network element, data traffic to be processed by a service chain that specifies an ordered sequence of service pools including a first service pool and second service pool, wherein each service pool comprises a plurality of network services;
determining that the first service pool has a capacity different than a capacity of the second service pool, wherein capacity of a given service pool is based on an accumulation of capacities of the plurality of network services in the given service pool;
associating dynamically instantiated network services with the first service pool or removing network services from the first service pool until the capacity of the first service pool is substantially equal to the capacity of the second service pool;
determining a network service from the first service pool to be applied to the data traffic; and
forwarding the data traffic to the network service in the first service pool.

2. The method of claim 1, further comprising, after the network service in the first service pool is applied to the data traffic, forwarding the data traffic to a network service in the second service pool.

3. The method of claim 1, wherein each service pool in the service chain includes a plurality of similar function network services.

4. The method of claim 1, further comprising computing the capacity of each of the plurality of network services from one or more of total data traffic throughput, total number of connections, and connection rate.

5. The method of claim 1, further comprising:
determining that the capacity of the first service pool associated with the service chain is below a predetermined capacity requirement; and
associating dynamically instantiated network services with the first service pool until the capacity of the first service pool meets or exceeds the predetermined capacity requirement.

6. The method of claim 1, comprising:
determining that the capacity of the first service pool associated with the service chain is above a predetermined capacity requirement; and removing network services from the first service pool until the capacity of the first service pool is substantially equal to the predetermined capacity requirement.

7. The method of claim 1, wherein determining the network service from the first service pool comprises selecting the network service according to a load balancing algorithm applied to the first service pool.

8. The method of claim 1, further comprising:
in response to detecting that performance metrics for the network service in the first service pool have changed with respect to a predetermined threshold, removing the network service from the first service pool or adding a new network service to the first service pool.

9. An apparatus comprising:
a plurality of network ports;
a network processor unit coupled to the plurality of network ports;
a processor coupled to the network processor unit, and configured to:
receive, at a network element, data traffic to be processed by a service chain that specifies an ordered sequence of service pools including a first service pool and second service pool, wherein each service pool comprises a plurality of network services;
determine that the first service pool has a capacity different than a capacity of the second service pool, wherein capacity of a given service pool is based on an accumulation of capacities of the plurality of network services in the given service pool;
associate dynamically instantiated network services with the first service pool or remove network services from the first service pool until the capacity of the first service pool is substantially equal to the capacity of the second service pool;
determine a network service from the first service pool to be applied to the data traffic; and
forward the data traffic to the network service in the first service pool.

10. The apparatus of claim 9, wherein the processor is further configured to, after the network service in the first service pool is applied to the data traffic, forward the data traffic to a network service in the second service pool.

11. The apparatus of claim 9, wherein the processor is further configured to:
determine that the capacity of the first service pool associated with the service chain is below a predetermined capacity requirement; and
associate dynamically instantiated network services with the first service pool until the capacity of the first service pool meets or exceeds the predetermined capacity requirement.

12. The apparatus of claim 9, wherein the processor is further configured to:
determine that the capacity of the first service pool associated with the service chain is above a predetermined capacity requirement; and
remove network services from the first service pool until the capacity of the first service pool is substantially equal to the predetermined capacity requirement.

13. The apparatus of claim 9, wherein the processor is further configured to:
in response to detecting that performance metrics for the network service in the first service pool have changed with respect to a predetermined threshold, remove the network service from the first service pool or add a new network service to the first service pool.

14. The apparatus of claim 9, wherein the processor is further configured to compute the capacity of each of the plurality of network services from one or more of total data traffic throughput, total number of connections, and connection rate.

15. The apparatus of claim 9, wherein the processor is configured to determine the network service from the first service pool by selecting the network service according to a load balancing algorithm applied to the first service pool.

16. A non-transitory computer-readable storage media encoded with software comprising computer executable instructions and when the software is executed operable to:
receive, at a network element, data traffic to be processed by a service chain that specifies an ordered sequence of service pools including a first service pool and second service pool, wherein each service pool comprises a plurality of network services;
determine that the first service pool has a capacity different than a capacity of the second service pool, wherein capacity of a given service pool is based on an accumulation of capacities of the plurality of network services in the given service pool;
associate dynamically instantiated network services with the first service pool or remove network services from the first service pool until the capacity of the first service pool is substantially equal to the capacity of the second service pool;
determine a network service from the first service pool to be applied to the data traffic; and
forward the data traffic to the network service in the first service pool.

17. The computer-readable storage media of claim 16, further comprising instructions operable to compute the capacity of each of the plurality of network services from one or more of total data traffic throughput, total number of connections, and connection rate.

18. The computer-readable storage media of claim 17, wherein the instructions are further configured to, after the network service in the first service pool is applied to the data traffic, forward the data traffic to a network service in the second service pool.

19. The computer-readable storage media of claim 17, further comprising instructions operable to:
determine that the capacity of the first service pool associated with the service chain is below a predetermined capacity requirement; and
associate dynamically instantiated network services with the first service pool until the capacity of the first service pool meets or exceeds the predetermined capacity requirement.

20. The computer-readable storage media of claim 17, further comprising instructions operable to:
determine that the capacity of the first service pool associated with the service chain is above a predetermined capacity requirement; and
remove network services from the first service pool until the capacity of the first service pool is substantially equal to the predetermined capacity requirement.

21. The computer-readable storage media of claim 17, further comprising instructions operable to:
in response to detecting that performance metrics for the network service in the first service pool have changed with respect to a predetermined threshold, remove the network service from the first service pool or add a new network service to the first service pool.

* * * * *